(12) United States Patent
Peterson

(10) Patent No.: US 7,152,468 B1
(45) Date of Patent: Dec. 26, 2006

(54) ILLUMINATED RAIN GAUGE

(75) Inventor: George W. Peterson, Lincoln, NE (US)

(73) Assignee: Garner Industries, Inc., Lincoln, NE (US)

( * ) Notice: Subject to any disclaimer, the term of this patent is extended or adjusted under 35 U.S.C. 154(b) by 0 days.

(21) Appl. No.: 10/975,300

(22) Filed: Oct. 28, 2004

(51) Int. Cl.
G01W 1/00 (2006.01)
(52) U.S. Cl. .................................... 73/170.17
(58) Field of Classification Search ............. 73/170.17; 116/227, 228
See application file for complete search history.

(56) References Cited

U.S. PATENT DOCUMENTS

| 4,587,845 | A | * | 5/1986 | Varga ..................... 73/325 |
| 5,038,606 | A | * | 8/1991 | Geschwender et al. .. 73/170.17 |
| 5,138,301 | A | * | 8/1992 | Delahaye ................... 340/607 |
| 5,571,963 | A | * | 11/1996 | Balchin et al. ........... 73/170.21 |
| 5,782,552 | A | | 7/1998 | Green et al. ............... 362/183 |
| 6,013,985 | A | | 1/2000 | Green et al. ............... 315/149 |
| 6,120,165 | A | | 9/2000 | Shalvi ........................ 362/276 |
| 6,832,166 | B1 | * | 12/2004 | Schutzbach ................. 702/50 |

FOREIGN PATENT DOCUMENTS

JP 2003228786 A * 8/2003

* cited by examiner

Primary Examiner—Edward Lefkowitz
(74) Attorney, Agent, or Firm—Thomte, Mazour & Niebergall; Dennis L. Thomte

(57) ABSTRACT

An illuminated rain gauge comprising an elongated, transparent collection vessel or tube having upper and lower ends with the lower end thereof being closed by a plug and which has a funnel-shaped collector at the upper end thereof. A support is positioned within the funnel-shaped collector and has a solar collector or panel mounted thereon. A light source such as an LED is positioned on the underside of the support and is powered by the solar panel. The LED directs light into the collection vessel so that the rainfall amounts may be determined during periods of darkness. The illuminated rain gauge may take many forms and/or shapes. In one embodiment, the light source is battery powered. In another embodiment, the light source is battery powered and wireless controlled.

18 Claims, 8 Drawing Sheets

ILLUMINATED RAIN GAUGE

BACKGROUND OF THE INVENTION

1. Field of the Invention

This invention relates to a rain gauge and more particularly to an illuminated rain gauge to facilitate the observation of the same during periods of darkness.

2. Description of the Related Art

Many rain gauges have been previously provided and come in various shapes and forms. Further, many efforts have been made to facilitate the reading of the rainfall indicia on the rain gauges. For example, U.S. Pat. No. 5,038,606 discloses a "jumbo" rain gauge wherein the indicia thereon is enlarged so that the rainfall amount may be read from a distance. Although the rain gauge of the above-identified patent and other rain gauges of the prior art do enhance the readability of the indicia on the rainfall collection vessel, it is difficult, if not impossible, to read the same or observe the rainfall level within the collection vessel during periods of darkness.

SUMMARY OF THE INVENTION

An illuminated rain gauge is disclosed comprising a transparent rain collecting vessel having indicia associated therewith. A light is provided on the rain gauge at the upper end thereof or the lower end thereof or at any place therebetween so that the rainfall level within the rain collection vessel may be seen as well as the indicia on the rain collection vessel. Preferably, the light source is a light-emitting diode (LED). The light is powered from a small battery, preferably recharged by solar power. If the light is recharged by solar-power, a solar panel is provided at the upper end of the rain gauge.

It is therefore a principal object of the invention to provide an illuminated rain gauge.

Yet another object of the invention is to provide an illuminated rain gauge having a solar-powered light system (solar panel, electronic circuitry, battery and LED) which illuminates the rain gauge so that the level of rainfall in the collection vessel may be observed and measured.

Still another object of the invention is to provide an illuminated rain gauge which enables the rain gauge to be read during periods of darkness.

Yet another object of the invention is to provide an illuminated rain gauge which is economical of manufacture, durable in use and refined in appearance.

These and other objects will be apparent to those skilled in the art.

DETAILED DESCRIPTION OF THE INVENTION

Figure 1:
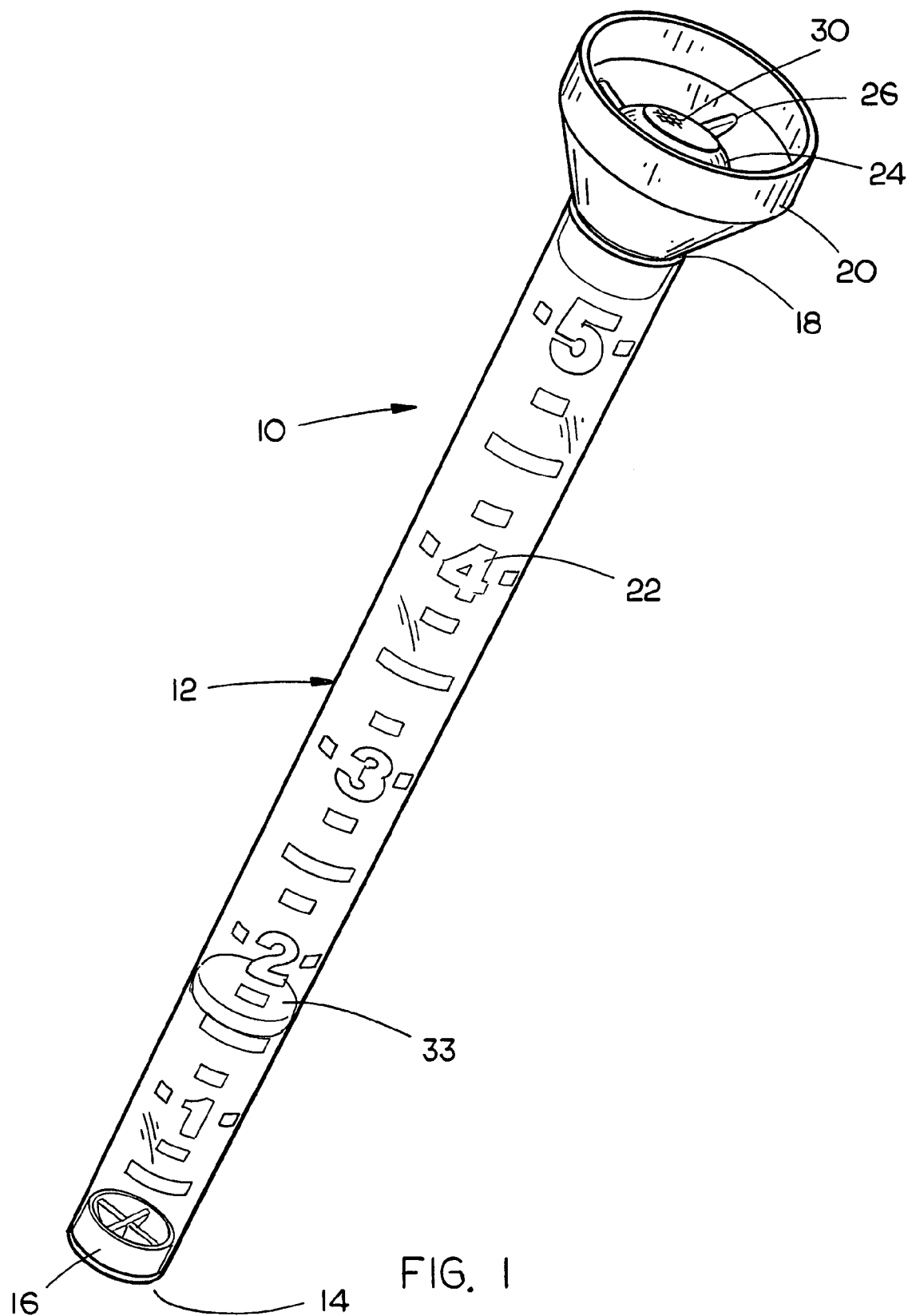
FIG. 1 is a perspective view of the rain gauge of this invention.
Figure 2:
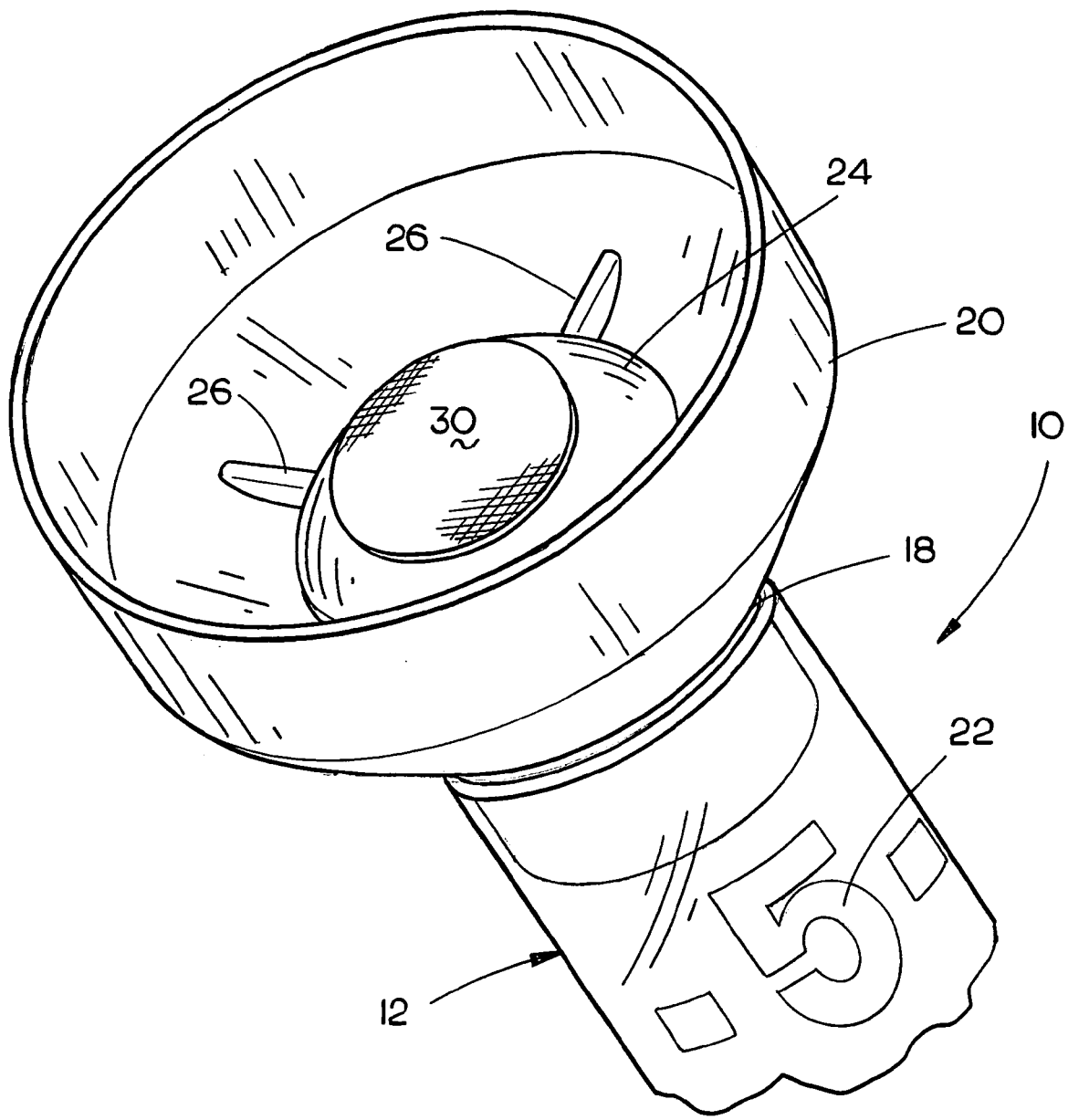
FIG. 2 is a partial perspective view of the rain gauge of this invention.

The illuminated rain gauge of this invention is referred to generally by the reference numeral 10 and is similar to the rain gauge disclosed in U.S. Pat. No. 5,038,606 except the illumination means described herein. The illumination means of this invention may be used on any type or shape of rain gauge. Therefore, the design of the rain gauge 10 illustrated in the drawings is merely for illustrative purposes.

Rain gauge 10 includes an elongated hollow collection vessel 12 which is preferably constructed of a transparent plastic material. Collection vessel 12 includes an open lower end 14 which is closed by a plug 16. Vessel 12 also includes an upper open end 18 having a funnel-shaped collector 20 mounted therein. The vessel 12 is provided with printed measurement indicia 22 thereon, as seen in the drawings.

Figure 5:
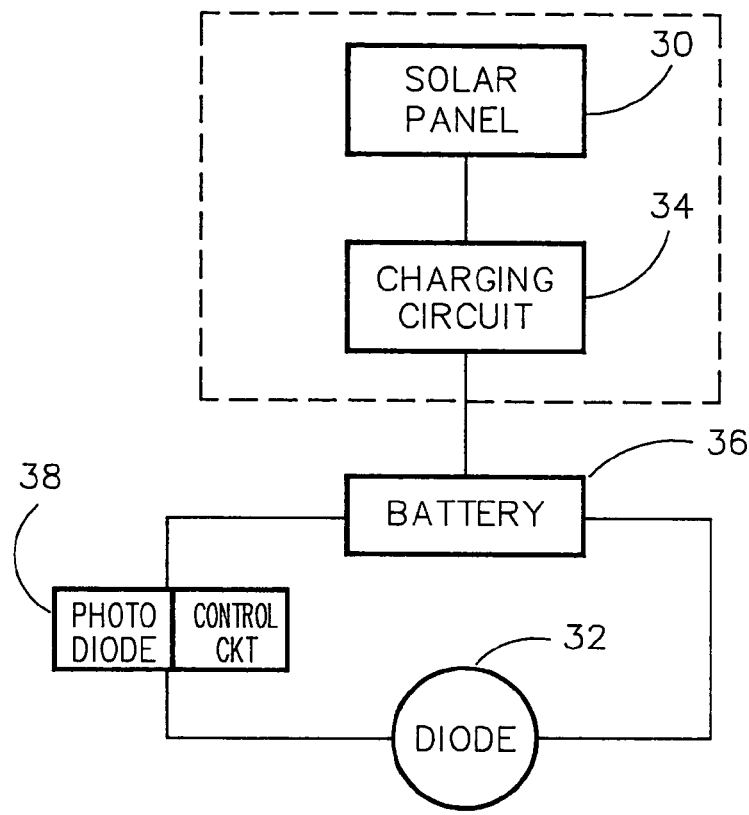
FIG. 5 is a schematic view of the electrical circuitry of the illumination means.
Figure 6:
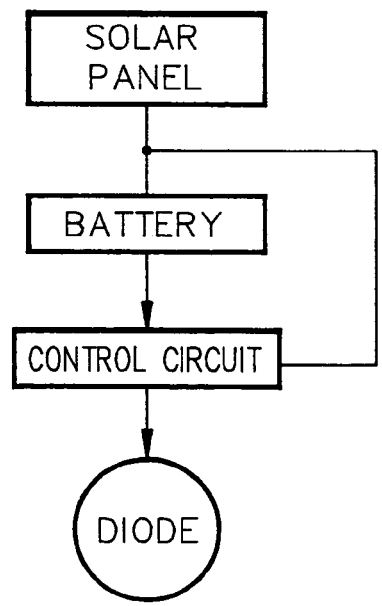
FIG. 6 is a schematic of a modified form of the electrical circuitry.

The numeral 24 refers to a support which is positioned within the funnel-shaped collector 20 by means support arms 26. A solar collector or panel 30 of conventional design is positioned on the upper end of the support 24, as seen in the drawings. The numeral 32 refers to a light, preferably a light-emitting diode (LED), which is positioned on the underside of the support 24. Preferably, solar panel 30 is electrically connected to a charging circuit 34 which in turn is electrically connected to a battery 36. Battery 36 is electrically connected to the LED 32, as seen in FIG. 5. The LED 32 directs light downwardly into the collection vessel 12 and indicated by the float 33 so that a person may observe the rainfall level in the collection vessel 12 and also observe the indicia 22 thereon during periods of darkness. Preferably, a photoelectric cell or photodiode 38 is imposed in the circuit between battery 36 and LED 32 so that the LED 32 will only be illuminated during hours of darkness. FIG. 6 illustrates a solar powered system in which the solar panel itself is used in place of a photo-diode as the light/dark sensor to turn the LED off and on.

Figure 3:
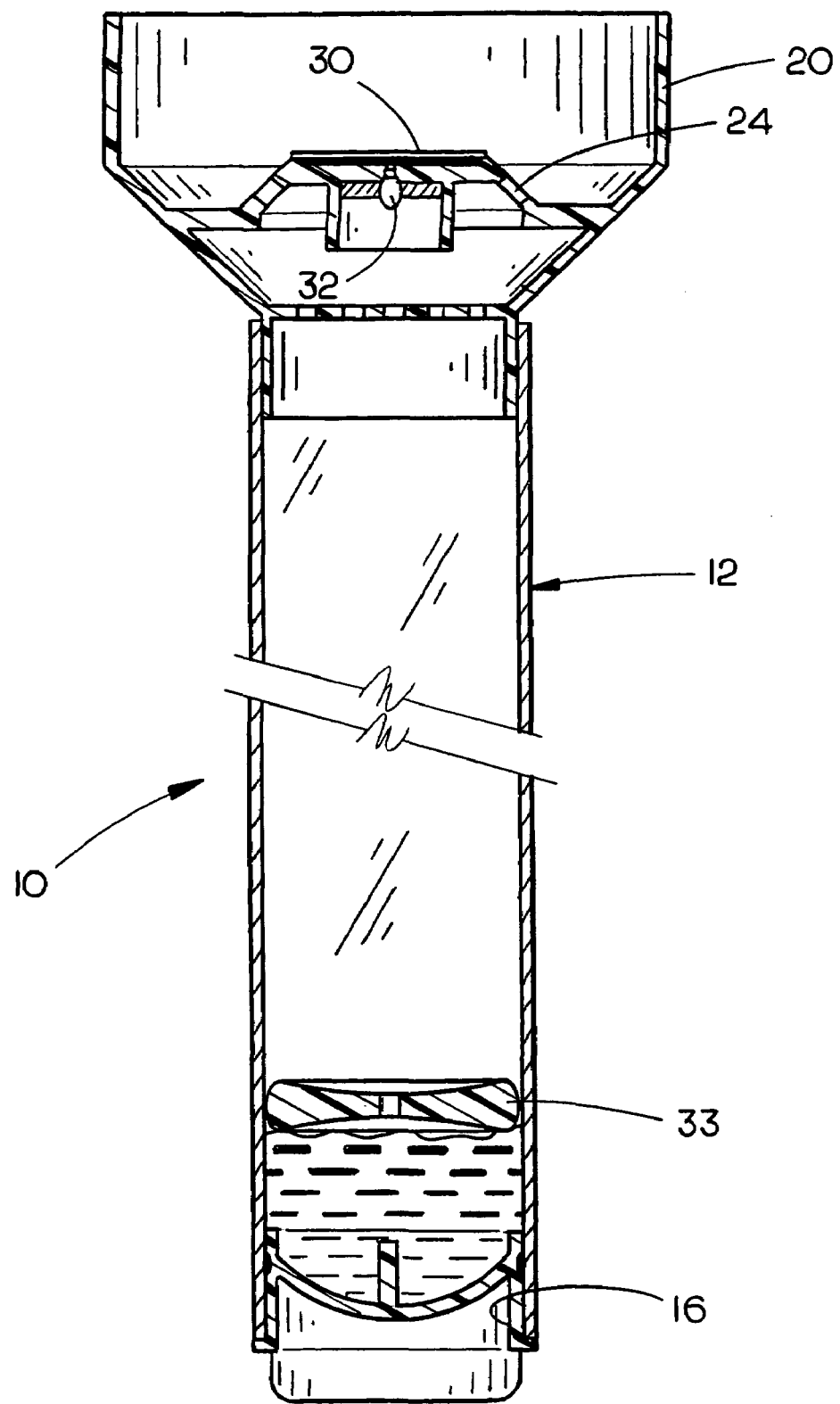
FIG. 3 is a vertical sectional view of the rain gauge of this invention.
Figure 4:
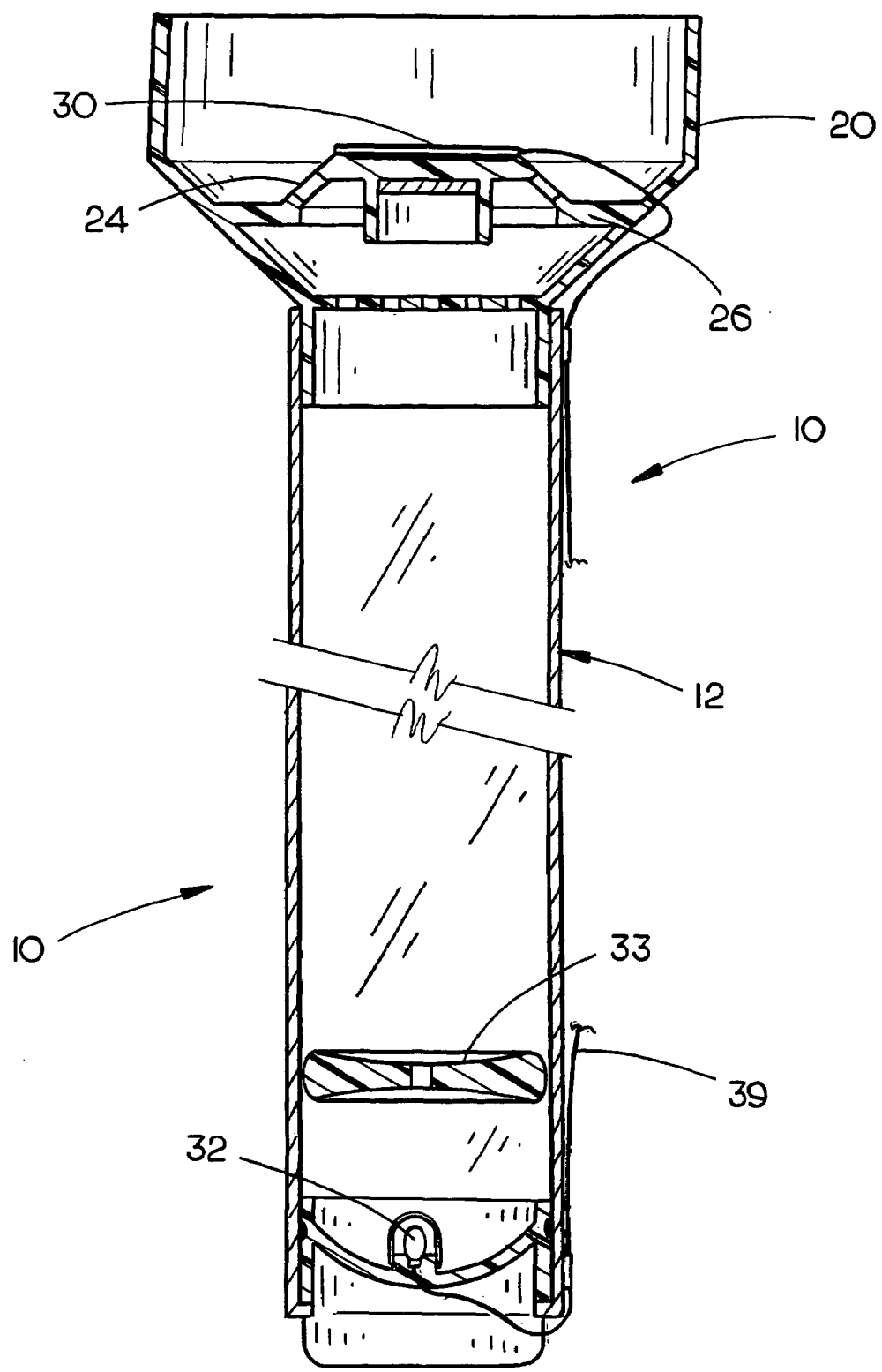
FIG. 4 is a view similar to FIG. 3 except that the light for the rain gauge is positioned at the lower end of the rain gauge.

Although it is preferred that the LED 32 be solar-powered in conventional fashion, a replaceable battery could be mounted on the support 24 for powering the LED 32. Additionally, although FIG. 3 illustrates that the LED 32 is located at the upper end of the rain gauge, the LED 32, or other light source, could be mounted at the lower end of the collection vessel 12, as seen in FIG. 4, and which is connected to the circuitry by lead 39.

Figure 7:
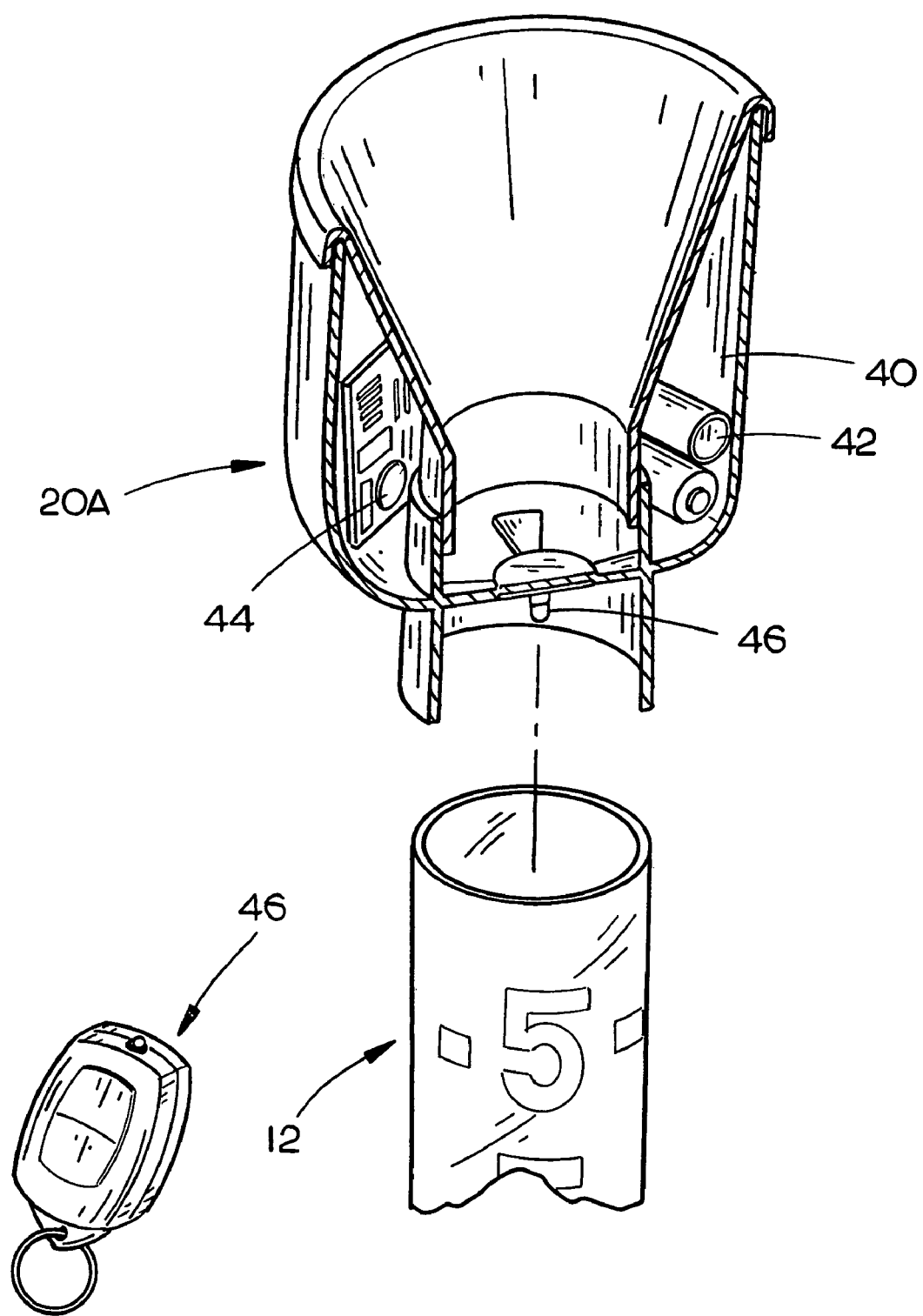
FIG. 7 is a partial perspective view of a modified form of the invention.

FIG. 7 illustrates a further embodiment of the illuminated rain gauge of this invention wherein a wireless battery/light is integrated into the funnel-shaped collector 20A. Collector 20A includes a compartment area 40 wherein the batteries 42 and circuits 44 are contained for powering and controlling the LED 46. The circuitry 44 is remotely controlled by a transmitter contained within a fob 46 similar to that used with vehicles. Fob 46 is adapted to turn the LED on and off to conserve battery life and provide more functionality to the user. This embodiment also eliminates the need for the solar power source. The wireless transmission may be accomplished by either RF (radio frequency) or IR (infrared light).

Figure 8:
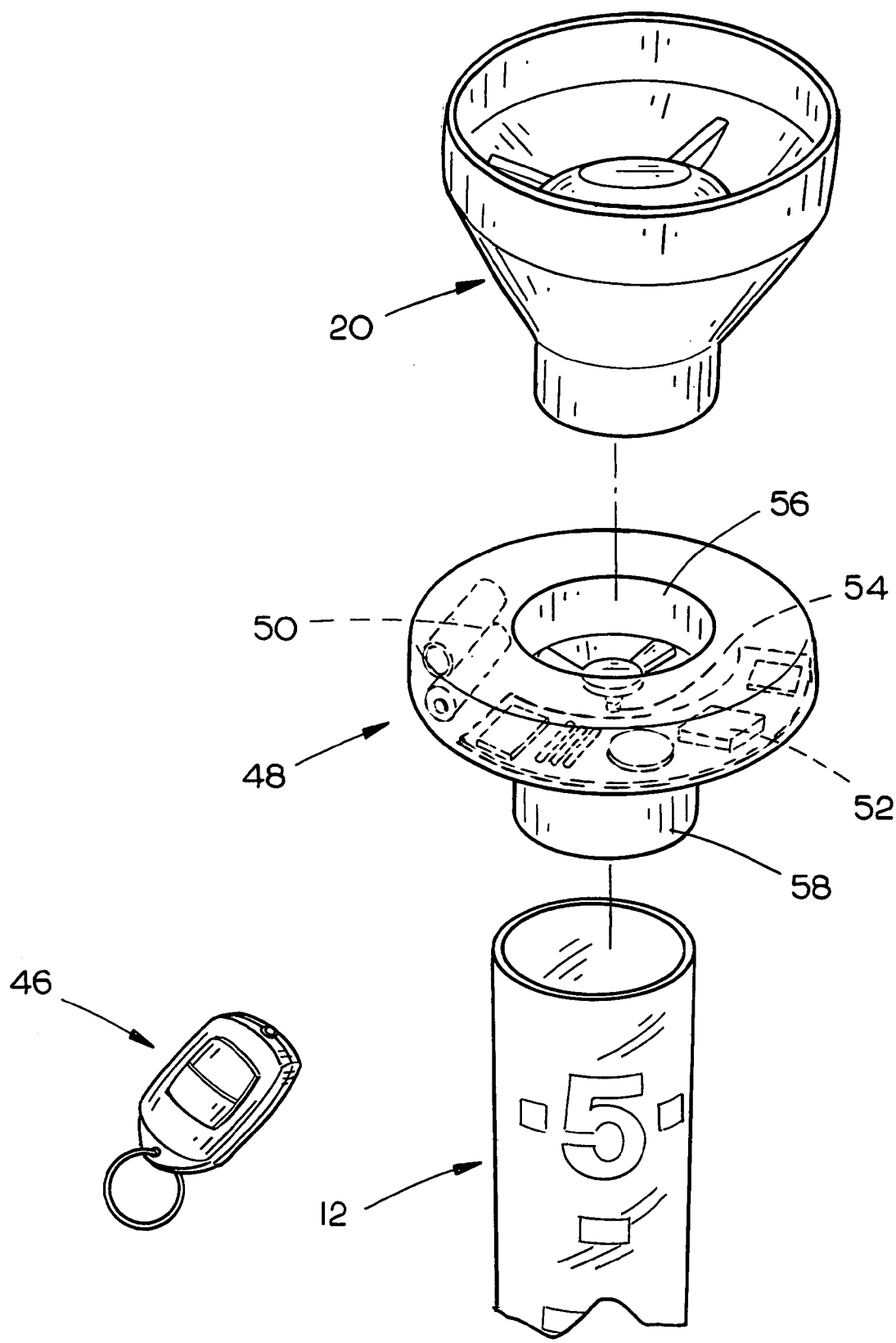
FIG. 8 is a partial perspective view of a further modified form of the invention.

FIG. 8 illustrates another embodiment of the illuminated rain gauge of this invention wherein a wireless light system 48 is positioned between the funnel-shaped collector 20 and the collection vessel 12. System 48 includes batteries 50, circuitry 52 and LED 54 which are remotely controlled by fob 46. As seen in FIG. 8, the system 48 has an opening 56 at its upper end which is adapted to receive the lower end of the collector 20. The lower end of the system 48 has a neck portion 58 which is adapted to be received by the upper end of the vessel 12.

When the system 48 is activated by the transmitter in fob 46, the LED 54 lights for a short time (i.e., 30 seconds) and automatically turns off. Preferably, the embodiment of FIG. 7 functions in the same manner as the system of FIG. 8.

Figure 9:
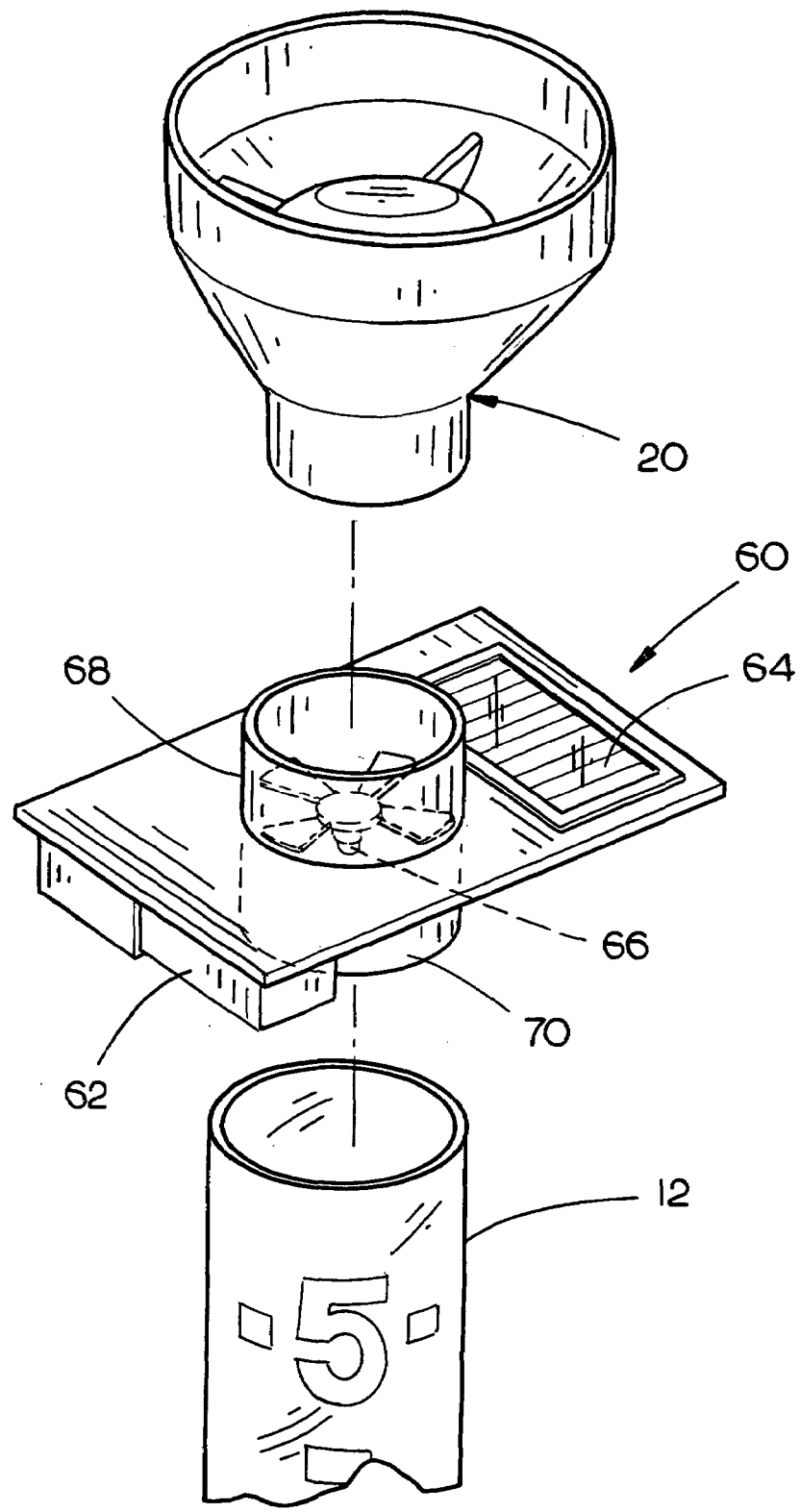
FIG. 9 is a partial perspective view of yet another modified form of the invention.

FIG. 9 illustrates yet another embodiment of the invention wherein a solar power battery recharge and light adapter system 60 is installed between the collector 20 and the vessel 12. The system 60 includes a rechargeable battery 62, a solar panel 64, LED 66 and the necessary circuitry. System 60 includes a ring-shaped sleeve or collar 68 at its upper end which is adapted to receive the lower end of collector 20 and a ring-shaped collar or adapter 70 at its lower end adapted to be received by the upper end of the vessel 12.

The embodiment of FIG. 7 permits a rain gauge such as shown in U.S. Pat. No. 5,038,606 to be modified into an illuminated rain gauge by replacing the funnel-shaped collector thereof by the system 20A. The embodiments of FIGS. 8 and 9 permit the modification of the rain gauge of U.S. Pat. No. 5,038,606 by simply installing the systems of either FIG. 8 or FIG. 9 between the funnel-shaped collector and the collection vessel of the rain gauge of said patent.

Thus it can be seen that the invention accomplishes at least all of its stated objectives.

I claim:

1. An illuminated rain gauge, comprising:
   an upstanding transparent rain collecting vessel having indicia associated therewith;
   said vessel having an open upper end for collecting rainfall;
   and an illumination means mounted on said vessel;
   said illumination means directing light towards said indicia on said vessel whereby the rainfall amount present in the vessel is visible during non-daylight hours.

2. The rain gauge of claim 1 wherein a solar panel means is associated with the rain gauge to power said illumination means.

3. The rain gauge of claim 1 wherein said vessel has upper and lower ends and said illumination means is positioned at the lower end of said vessel to direct light upwardly into said vessel.

4. The rain gauge of claim 1 wherein said vessel has upper and lower ends and said illumination means is positioned at the upper end of said vessel to direct light downwardly into said vessel.

5. The rain gauge of claim 1 wherein said illumination means is positioned in said open upper end of said vessel to direct light downwardly into the vessel.

6. The rain gauge of claim 5 wherein said illumination means and circuitry therefore is contained within a housing positioned between the upper end of said vessel and a funnel-shaped collector.

7. The rain gauge of claim 6 wherein a solar panel means is mounted on said housing.

8. The rain gauge of claim 1 wherein said illumination means is battery powered.

9. The rain gauge of claim 8 wherein said illumination means is remotely wireless controlled.

10. The rain gauge of claim 1 wherein said illumination means is remotely wireless controlled.

11. An illuminated rain gauge, comprising:
    an upstanding, transparent hollow tube having upper and lower ends;
    said tube having indicia thereon;
    a funnel-shaped collector positioned at the upper end of said tube for collecting rainfall;
    a solar panel positioned within said funnel-shaped collector;
    a light operatively powered by said solar panel;
    said light directing light towards said tube whereby the rainfall amount present in said tube is visible during non-daylight hours.

12. The rain gauge of claim 11 wherein said light is positioned in said funnel-shaped collector.

13. The rain gauge of claim 11 wherein said light is positioned at the upper end of said tube.

14. The rain gauge of claim 11 wherein said light is positioned at the lower end of said tube.

15. The rain gauge of claim 11 wherein said light directs light downwardly towards said tube.

16. The rain gauge of claim 11 wherein said light directs light upwardly towards said tube.

17. The rain gauge of claim 11 wherein said solar panel and said light are mounted on a housing selectively removably positioned between said tube and said collector.

18. The rain gauge of claim 11 wherein said solar panel also serves as a light/dark sensor for controlling the illumination of said light.

* * * * *